(12) United States Patent
Muttik et al.

(10) Patent No.: US 10,348,742 B2
(45) Date of Patent: *Jul. 9, 2019

(54) SYSTEM, METHOD, AND COMPUTER PROGRAM PRODUCT FOR DYNAMICALLY CONFIGURING A VIRTUAL ENVIRONMENT FOR IDENTIFYING UNWANTED DATA

(71) Applicant: McAfee, Inc., Santa Clara, CA (US)

(72) Inventors: Igor G. Muttik, Aylesbury (GB); Mikhail Yu Vorozhtsov, Milton Keynes (GB)

(73) Assignee: McAfee, LLC, Santa Clara, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 15/070,051

(22) Filed: Mar. 15, 2016

(65) Prior Publication Data

US 2016/0261620 A1  Sep. 8, 2016

Related U.S. Application Data

(63) Continuation of application No. 12/050,432, filed on Mar. 18, 2008, now Pat. No. 9,306,796.

(51) Int. Cl.
| | |
|---|---|
| *G06F 21/53* | (2013.01) |
| *H04L 29/06* | (2006.01) |
| *H04L 29/08* | (2006.01) |
| *G06F 9/455* | (2018.01) |
| *G06F 9/445* | (2018.01) |

(52) U.S. Cl.
CPC ...... *H04L 63/1416* (2013.01); *G06F 9/45533* (2013.01); *G06F 21/53* (2013.01); *H04L 29/08072* (2013.01); *H04L 63/1441* (2013.01); *H04L 63/1491* (2013.01); *H04L 67/34* (2013.01); *G06F 9/44505* (2013.01)

(58) Field of Classification Search
CPC .................. H04L 63/1416; H04L 63/1441
See application file for complete search history.

(56) References Cited

U.S. PATENT DOCUMENTS

| | | |
|---|---|---|
| 6,697,948 B1 | 2/2004 | Rabin et al. |
| 6,708,212 B2 | 3/2004 | Porras et al. |

(Continued)

FOREIGN PATENT DOCUMENTS

| | | | |
|---|---|---|---|
| KR | 20030023934 A | * | 3/2003 |
| WO | 2011082084 A2 | | 7/2011 |
| WO | 2011082084 A3 | | 7/2011 |

OTHER PUBLICATIONS

"VMware DiskMount Utility: User's Manual", http://www.vmware.com/pdf/VMwareDiskMount.pdf, 1998-2005, Revision Jan. 8, 2005, VMware, Inc., 6 pages.

(Continued)

*Primary Examiner* — Farid Homayounmehr
*Assistant Examiner* — Zhimei Zhu
(74) *Attorney, Agent, or Firm* — Hanley, Flight & Zimmerman, LLC

(57) ABSTRACT

A system, method, and computer program product are provided for dynamically configuring a virtual environment for identifying unwanted data. In use, a virtual environment located on a first device is dynamically configured based on at least one property of a second device. Further, unwanted data is identified, utilizing the virtual environment.

24 Claims, 5 Drawing Sheets

(56) References Cited

U.S. PATENT DOCUMENTS

| | | | |
|---|---|---|---|
| 6,981,155 | B1 | 12/2005 | Lyle et al. |
| 7,095,716 | B1 | 8/2006 | Ke et al. |
| 7,409,712 | B1 | 8/2008 | Brooks et al. |
| 7,512,977 | B2 | 3/2009 | Cook et al. |
| 7,752,667 | B2 | 7/2010 | Challener et al. |
| 7,945,787 | B2 | 5/2011 | Gassoway |
| 9,306,796 | B1* | 4/2016 | Muttik ............... H04L 63/1491 |
| 2004/0203589 | A1 | 12/2004 | Wang et al. |
| 2005/0015455 | A1 | 1/2005 | Liu |
| 2005/0027818 | A1 | 2/2005 | Friedman et al. |
| 2005/0065899 | A1 | 3/2005 | Li et al. |
| 2005/0246704 | A1* | 11/2005 | Romm ............... G06F 9/44505 717/178 |
| 2005/0262576 | A1 | 11/2005 | Gassoway |
| 2006/0036693 | A1 | 2/2006 | Hulten et al. |
| 2006/0070130 | A1 | 3/2006 | Costea et al. |
| 2006/0150256 | A1 | 7/2006 | Fanton et al. |
| 2007/0016953 | A1 | 1/2007 | Morris et al. |
| 2007/0028304 | A1 | 2/2007 | Brennan |
| 2007/0079379 | A1 | 4/2007 | Sprosts et al. |
| 2007/0226804 | A1 | 9/2007 | Somkiran et al. |
| 2007/0240217 | A1 | 10/2007 | Tuvell et al. |
| 2007/0240220 | A1 | 10/2007 | Tuvell et al. |
| 2007/0250930 | A1* | 10/2007 | Aziz ............... G06F 21/554 726/24 |
| 2007/0261112 | A1 | 11/2007 | Todd et al. |
| 2008/0126779 | A1 | 5/2008 | Smith |
| 2008/0141373 | A1 | 6/2008 | Fossen et al. |
| 2008/0168533 | A1 | 7/2008 | Ozaki et al. |
| 2008/0196099 | A1 | 8/2008 | Shastri |
| 2008/0295177 | A1 | 11/2008 | Dellinger et al. |
| 2009/0044024 | A1 | 2/2009 | Oberheide et al. |
| 2009/0064329 | A1 | 3/2009 | Okumura et al. |
| 2009/0088133 | A1 | 4/2009 | Orlassino |
| 2009/0254992 | A1 | 10/2009 | Schultz et al. |

OTHER PUBLICATIONS

Wolf, Chris, Column: "Virtual Server 2005 R2 SPI Treasures: VHD Mount", Jun. 2007, Microsoft Certified Professional Magazine Online, Downloaded on Feb. 27, 2008 from—http://mcpmag.com/columns/article_asp?EditorialsID=1793—pp. 1-5.
"Chroot(2)—Linux man page", Downloaded on Feb. 27, 2008 from—http://linux.die.net/man/2/chroot—p. 1-2 D.
"Linux/Unix Command: chroot", Downloaded on Feb. 27, 2008 from—http://linux_about.com/library/cmd/blcmdl2_chroot.htm—pp. 1-3.
Christodorescu, Miha et al. "Testing Malware Detectors", In the Proceedings of the ACM SIGSOFT International Symposium on Software Testing and Analysis (ISSTA '04), vol. 29, Issue 4, Jul. 11-14, 2004, Boston Massachusetts, 11 pages.
"Blacklist", Wikipedia, last modified Jun. 5, 2008, Wikipedia Foundation, Inc. Downloaded from—http://en.wikipedia.org/wiki/Blacklist-, pp. 1-3.
An Architecture for Generating Semantics-Aware Signatures; Vinod Yegneswaran, Jonathon T. Giffin, Paul Barford, Somesh Jha; Appeared in Proceedings of Usenix Security Symposium 2005, year 2005, all pages.
Office Action Summary from U.S. Appl. No. 11/946,777 dated Jun. 13, 2011.
U.S. Appl. No. 11/946,777, filed Nov. 28, 2007.
Office Action Summary from U.S. Appl. No. 11/946,777 dated Jan. 5, 2011.
U.S. Appl. No. 12/111,846, filed Apr. 29, 2008.
U.S. Appl. No. 12/131,383, filed Jun. 2, 2008.
U.S. Appl. No. 12/144,967, filed Jun. 24, 2008.
United States Patent and Trademark Office, "Final Office action," issued in connection with U.S. Appl. No. 12/050,432, dated Jun. 21, 2012, 9 pages. (Copy not provided as this is a USPTO document. Will provide upon request by Examiner.).

United States Patent and Trademark Office, "Non-Final Office action," issued in connection with U.S. Appl. No. 12/050,432, dated Mar. 12, 2012, 14 pages. (Copy not provided as this is a USPTO document. Will provide upon request by Examiner.).
United States Patent and Trademark Office, "Final Office action," issued in connection with U.S. Appl. No. 12/050,432, dated May 13, 2011, 9 pages. (Copy not provided as this is a USPTO document. Will provide upon request by Examiner.).
United States Patent and Trademark Office, "Notice of Allowance," issued in connection with U.S. Appl. No. 12/050,432, dated Dec. 16, 2015, 9 pages. (Copy not provided as this is a USPTO document. Will provide upon request by Examiner.).
United States Patent and Trademark Office, "Notice of Panel Decision from Pre-Appeal Brief Review," issued in connection with U.S. Appl. No. 12/050,432, dated Nov. 2, 2012, 2 pages. (Copy not provided as this is a USPTO document. Will provide upon request by Examiner.).
United States Patent and Trademark Office, "Advisory Action," issued in connection with U.S. Appl. No. 12/050,432, dated Jul. 29, 2011, 11 pages. (Copy not provided as this is a USPTO document. Will provide upon request by Examiner.).
United States Patent and Trademark Office, "Non-Final Office action," issued in connection with U.S. Appl. No. 12/050,432, dated Oct. 6, 2010, 9 pages. (Copy not provided as this is a USPTO document. Will provide upon request by Examiner.).
United States Patent and Trademark Office, "Final Office action," issued in connection with U.S. Appl. No. 12/144,967, dated Aug. 17, 2011, 12 pages. (Copy not provided as this is a USPTO document. Will provide upon request by Examiner.).
United States Patent and Trademark Office, "Non-Final Office action," issued in connection with U.S. Appl. No. 12/111,846, dated Jun. 24, 2011, 24 pages. (Copy not provided as this is a USPTO document. Will provide upon request by Examiner.).
United States Patent and Trademark Office, "Non-Final Office action," issued in connection with U.S. Appl. No. 12/111,846, dated Jun. 18, 2012, 16 pages. (Copy not provided as this is a USPTO document. Will provide upon request by Examiner.).
United States Patent and Trademark Office, "Final Office action," issued in connection with U.S. Appl. No. 12/111,846, dated Nov. 15, 2011, 15 pages. (Copy not provided as this is a USPTO document. Will provide upon request by Examiner.).
United States Patent and Trademark Office, "Non-Final Office action," issued in connection with U.S. Appl. No. 12/131,383, dated Jun. 24, 2011, 11 pages. (Copy not provided as this is a USPTO document. Will provide upon request by Examiner.).
United States Patent and Trademark Office, "Final Office action," issued in connection with U.S. Appl. No. 12/131,383, dated Jun. 28, 2012, 31 pages. (Copy not provided as this is a USPTO document. Will provide upon request by Examiner.).
United States Patent and Trademark Office, "Final Office action," issued in connection with U.S. Appl. No. 12/131,383, dated Oct. 17, 2011, 21 pages. (Copy not provided as this is a USPTO document. Will provide upon request by Examiner.).
United States Patent and Trademark Office, "Non-Final Office action," issued in connection with U.S. Appl. No. 12/131,383, dated Mar. 6, 2012, 32 pages. (Copy not provided as this is a USPTO document. Will provide upon request by Examiner.).
United States Patent and Trademark Office, "Final Office action," issued in connection with U.S. Appl. No. 12/398,073, dated Apr. 12, 2012, 16 pages. (Copy not provided as this is a USPTO document. Will provide upon request by Examiner.).
United States Patent and Trademark Office, "Non-Final Office action," issued in connection with U.S. Appl. No. 12/144,967, dated Mar. 15, 2012, 13 pages. (Copy not provided as this is a USPTO document. Will provide upon request by Examiner.).
United States Patent and Trademark Office, "Advisory Action," issued in connection with U.S. Appl. No. 12/398,073, dated Jul. 5, 2012, 3 pages. (Copy not provided as this is a USPTO document. Will provide upon request by Examiner.).
United States Patent and Trademark Office, "Non-Final Office action," issued in connection with U.S. Appl. No. 12/693,765, dated Mar. 13, 2012, 23 pages. (Copy not provided as this is a USPTO document. Will provide upon request by Examiner.).

(56) References Cited

OTHER PUBLICATIONS

United States Patent and Trademark Office, "Non-Final Office action," issued in connection with U.S. Appl. No. 12/398,073, dated Oct. 4, 2011, 15 pages. (Copy not provided as this is a USPTO document. Will provide upon request by Examiner.).

United States Patent and Trademark Office, "Decision on Appeal," issued in connection with U.S. Appl. No. 12/050,432, dated Sep. 18, 2015, 9 pages. (Copy not provided as this is a USPTO document. Will provide upon request by Examiner.).

United States Patent and Trademark Office, "Examiner's Answer," issued in connection with U.S. Appl. No. 12/050,432, dated Feb. 27, 2013, 12 pages. (Copy not provided as this is a USPTO document. Will provide upon request by Examiner.).

* cited by examiner

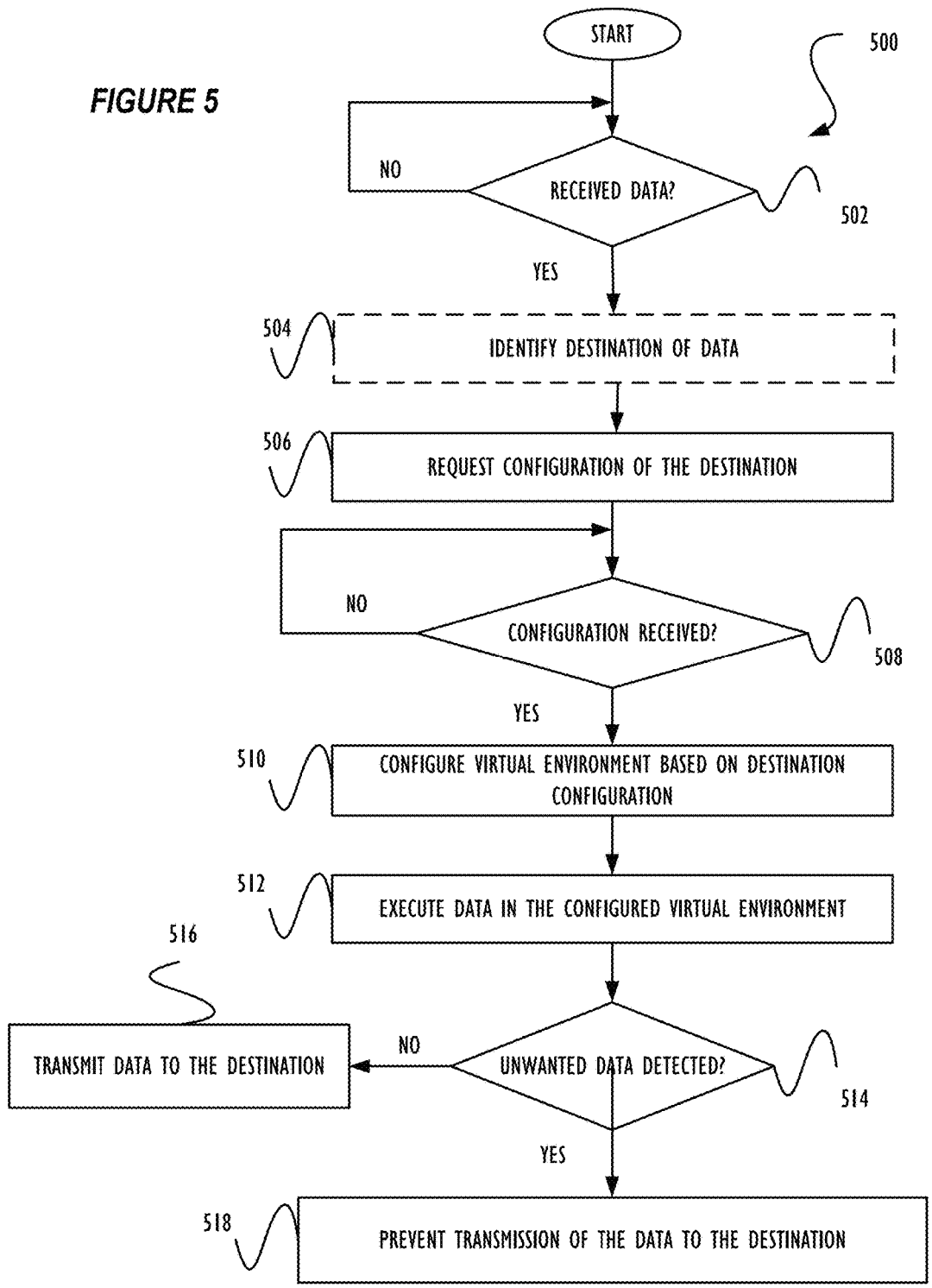

SYSTEM, METHOD, AND COMPUTER PROGRAM PRODUCT FOR DYNAMICALLY CONFIGURING A VIRTUAL ENVIRONMENT FOR IDENTIFYING UNWANTED DATA

TECHNICAL FIELD

The present invention relates to security systems, and more particularly to security systems that employ virtual environments.

BACKGROUND ART

Security systems have traditionally been utilized for detecting unwanted data. For example, security systems are oftentimes used by gateway devices, server devices, client devices, etc. for detecting malware. Some security systems employ virtual environments for executing potentially unwanted data therein, such that it may be determined (e.g. via a behavioral analysis, etc.) whether the data is unwanted. The unwanted data has generally included any program, code, active content (e.g. links, uniform resource locators, etc.) and/or any other computer readable data that is unwanted.

However, conventional techniques used by security systems that implement virtual environments have exhibited various limitations. For example, the virtual environments have generally been unrepresentative of an actual device on which the potentially unwanted data may otherwise execute. Thus, utilizing such virtual environments for detecting unwanted data has been defective.

There is thus a need for addressing these and/or other issues associated with the prior art.

SUMMARY

A system, method, and computer program product are provided for dynamically configuring a virtual environment for identifying unwanted data. In use, a virtual environment located on a first device is dynamically configured based on at least one property of a second device. Further, unwanted data is identified, utilizing the virtual environment.

BRIEF DESCRIPTION OF DRAWINGS

FIG. 5 shows a method for conditionally preventing transmission of unwanted data detected utilizing a dynamically configured virtual environment, in accordance with still yet another embodiment.

DESCRIPTION OF EMBODIMENTS

Figure 1:
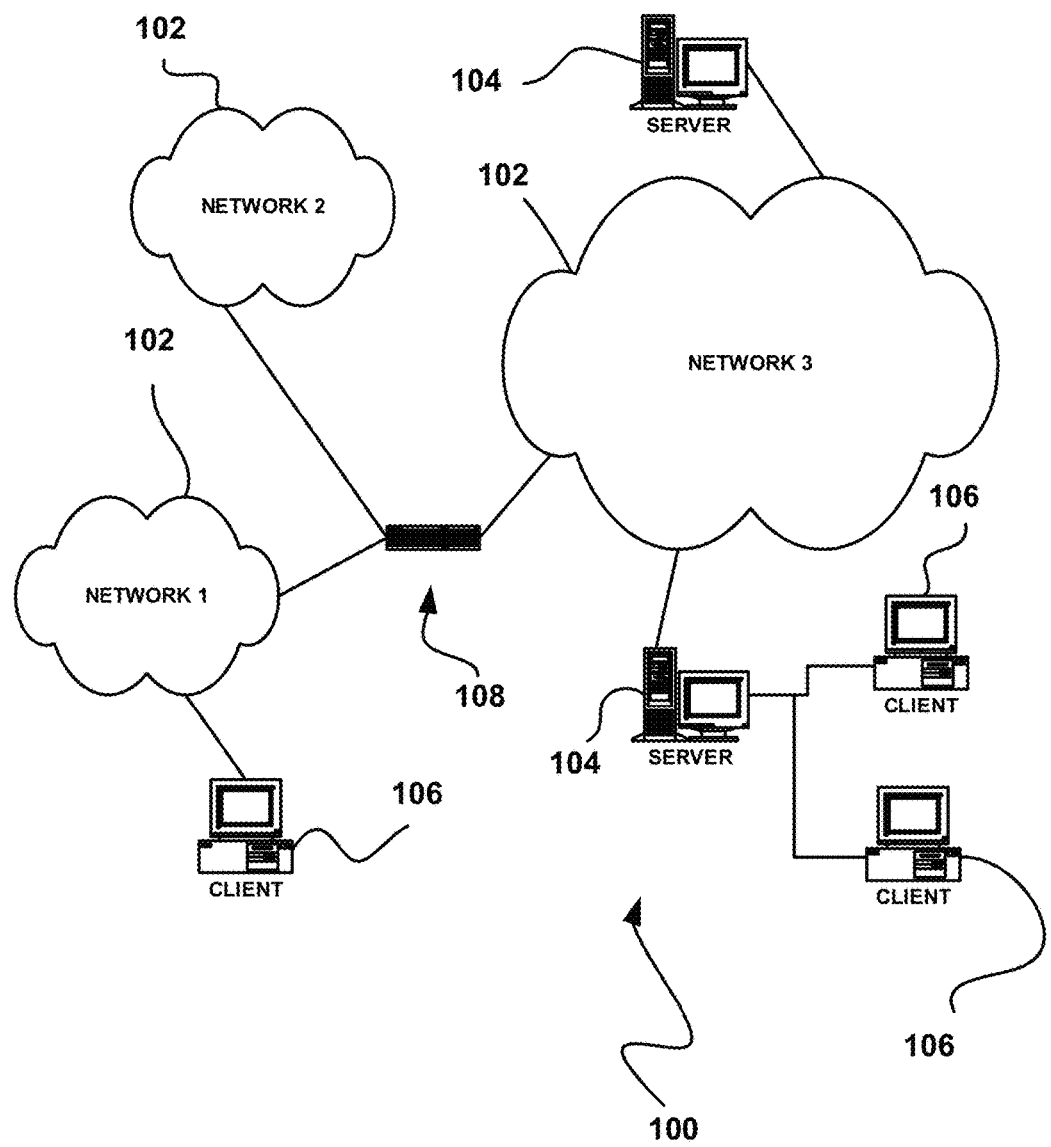
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
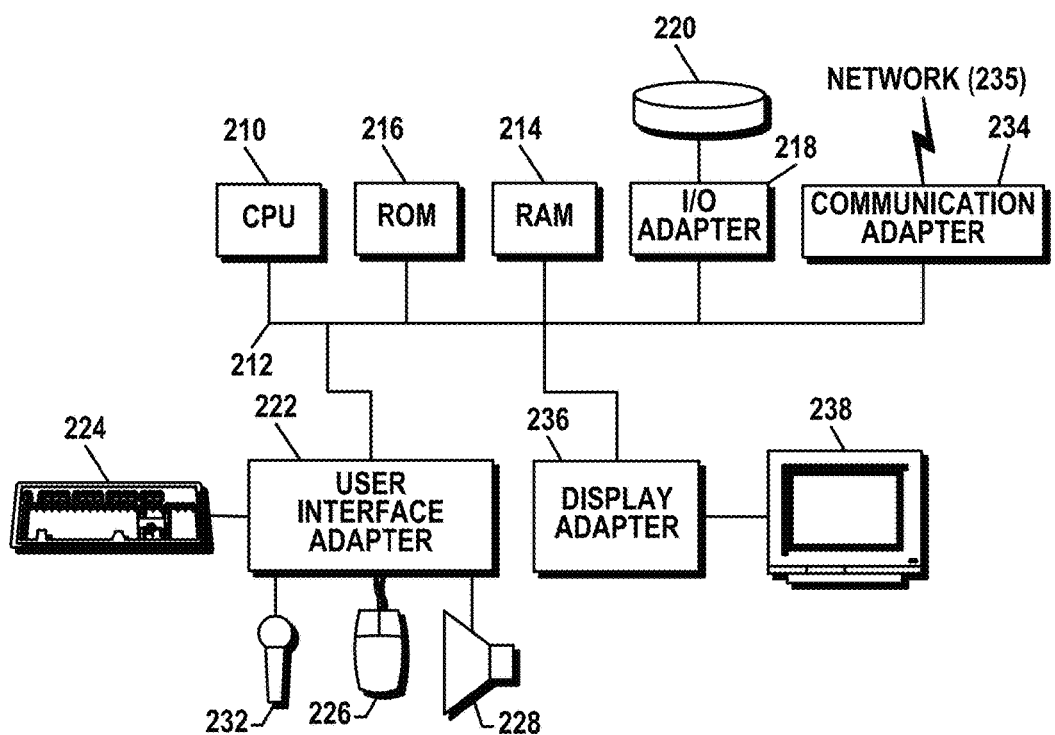
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
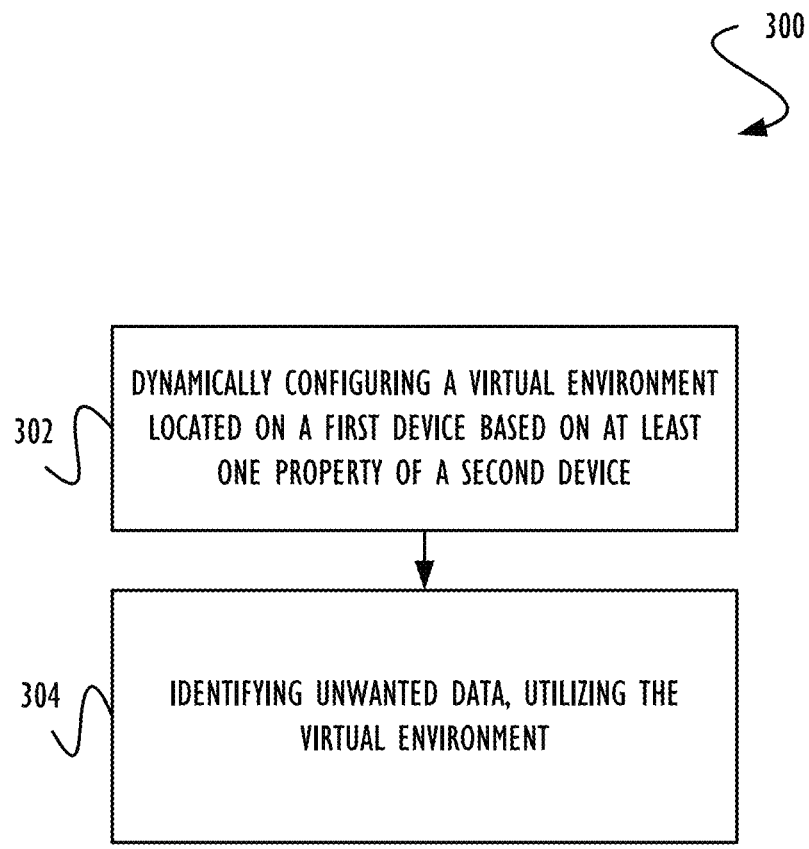
FIG. 3 shows a method for dynamically configuring a virtual environment for identifying unwanted data, in accordance with another embodiment.

FIG. 3 shows a method 300 for dynamically configuring a virtual environment for identifying unwanted data, in accordance with another embodiment. As an option, the method 300 may be carried out in the context of the architecture and environment of FIGS. 1 and/or 2. Of course, however, the method 300 may be carried out in any desired environment.

As shown in operation 302, a virtual environment located on a first device is dynamically configured based on at least one property of a second device. With respect to the present description, the virtual environment may include any environment that is virtually employed. For example, the virtual environment may include a virtualization of any desired environment (e.g. hardware environment, software environment, etc.).

In one embodiment, the virtual environment may include at least one virtual machine. For example, the virtual machine may include a software implementation of a physical device. In another embodiment, the virtual environment may include a virtual replica of a device (e.g. the second device, etc.). In other embodiments, the virtual environment may include a sandbox, an emulator, etc.

Additionally, the first device may include any device on which the virtual environment may be located. As an option, the first device may be capable of employing the virtual environment. Just by way of example, the first device may include a server device. Of course, however, the first device may include any of the devices described above with respect to FIGS. 1 and/or 2.

Also, in one embodiment, the second device may be separate from the first device. For example, the second device may be coupled to the first device via a network (e.g. such as any of the networks described above with respect to FIG. 1). As an option, the second device may include a client device, but of course may also include any of the devices described above with respect to FIGS. 1 and/or 2.

In another embodiment, the second device may include a virtual device. Just by way of example, the second device may include a virtual representation of a device (e.g. a client device, etc.) located on the first device. Such virtual device may be different from the virtual environment dynamically configured based on the property of the second device.

In still yet another embodiment, the second device may include a system of the first device. Thus, the second device may optionally be located on the first device. Of course, it should be noted that the second device may include any device with at least one property based on which the virtual environment may be dynamically configured.

Further, the property of the second device based on which the virtual environment is dynamically configured may include any property associated with the second device. As an option, the property may include a dynamic property associated with the second device (e.g. a property that may change over time, etc.). In one embodiment, the property may represent at least a portion of settings of the second device, in one embodiment. In another embodiment, the property may represent at least a portion of a configuration of the second device. In still yet another embodiment, the property may represent at least a portion of a platform utilized by the second device.

For example, the property may include a list of hardware (e.g. hardware devices, etc.), such as hardware devices coupled to the second device. As another example, the property may include a list of software (e.g. drivers, applications, etc.). The software may include any code installed on the second device.

In yet other examples, the property may include an operating system identifier (e.g. an identifier of an operating system of the second device, an identifier of a version of the operating system, etc.), a patch identifier (e.g. an identifier of a patch installed on the operating system, etc.), identifiers of temporary network connections, registry modifications by applications on the second device, mapped local and/or remote drives associated with the second device, etc. As an option, the property may include a binary representation of any objects (e.g. hardware, software, etc.) associated with the second device. Just by way of example, the binary representation may include a binary image of a driver, operating system, etc. installed on the second device.

To this end, the virtual environment located on the first device may optionally be dynamically configured based on the property of the second device by configuring the virtual environment to include the property. Just by way of example, the virtual environment may be dynamically configured to include a driver, operating system, etc. located on the second device. As another example, the virtual environment may be dynamically configured to include registry settings indicating an existence of hardware coupled to the second device.

As an option, a binary representation included in the property of the second device may be utilized for configuring the virtual environment. For example, the binary representation of an object may be copied to the virtual environment. In this way, the virtual environment may optionally be configured to include the object of the second device.

In one embodiment, the virtual environment may be dynamically configured by sending at least one request from the first device to the second device. Such request may include a query, for example. As another example, the request may include a request for the property.

In another embodiment, the virtual environment may be dynamically configured by receiving information on the property at the first device from the second device, in response to the request. The information may identify the property, for example. In yet another embodiment, the information may be utilized for dynamically configuring the virtual environment (e.g. by configuring the virtual environment to include the property indicated by the information, etc.). As an option, the information may be cached at the first device (e.g. for avoiding a need to subsequently request the information from the second device, for limiting network traffic and/or other resource consumption associated with subsequent requests for previously received information, etc.).

Moreover, as shown in operation 304, unwanted data is identified, utilizing the virtual environment. With respect to the present description, the unwanted data may include any data that is determined to be unwanted. Just by way of example, the unwanted data may include malware (e.g. a virus, a worm, etc.). As an option, the unwanted data may be identified outside of the virtual environment, utilizing results of an analysis performed via the virtual environment.

In one embodiment, the unwanted data may be identified utilizing an analysis of data performed in the virtual environment. For example, the data may be executed in the virtual environment. Further, a behavioral analysis may be performed on the execution of the data in the virtual environment. In this way, it may be determined that behavior of the data is unwanted, and thus that the data is unwanted. As another example, the data in the virtual environment may be matched with known unwanted data, for identifying the data as unwanted.

In another embodiment, the unwanted data may be identified by analyzing data in the virtual environment, utilizing a hierarchical data structure. Just by way of example, as the data is executed in a first virtual machine of the virtual environment, the execution may branch to a second virtual machine of the virtual environment. In this way, further execution of the data may be performed in the second virtual machine. It should be noted that any amount of branching may be performed.

As an option, the branching may be performed in response to a determination that the virtual machine in which the data is being executed does not include a property utilized by the data. The property may include, for example, a registry, an application, a driver, etc. Accordingly, execution of the data may be branched to another virtual machine including such property utilized by the data. Of course, however, it should be noted that the unwanted data may be identified in any desired manner.

To this end, unwanted data may be identified utilizing a dynamically configured virtual environment. The dynamic configuration of the virtual environment may allow the unwanted data to be identified in a virtual environment that replicates the second device (e.g. a configuration of the second device, etc.), for example. In one embodiment, such second device may include a destination for the unwanted data, such that the unwanted data may optionally be detected prior to communication of the unwanted data to the second device. By dynamically configuring the virtual environment based on the property of the second device, the unwanted data may optionally be executed in the virtual environment as if the unwanted data is being executed on the second device (e.g. by providing access by the unwanted data to properties of the second device in the virtual environment, etc.), thus allowing an entirety of the behavior of the unwanted data to be realized.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
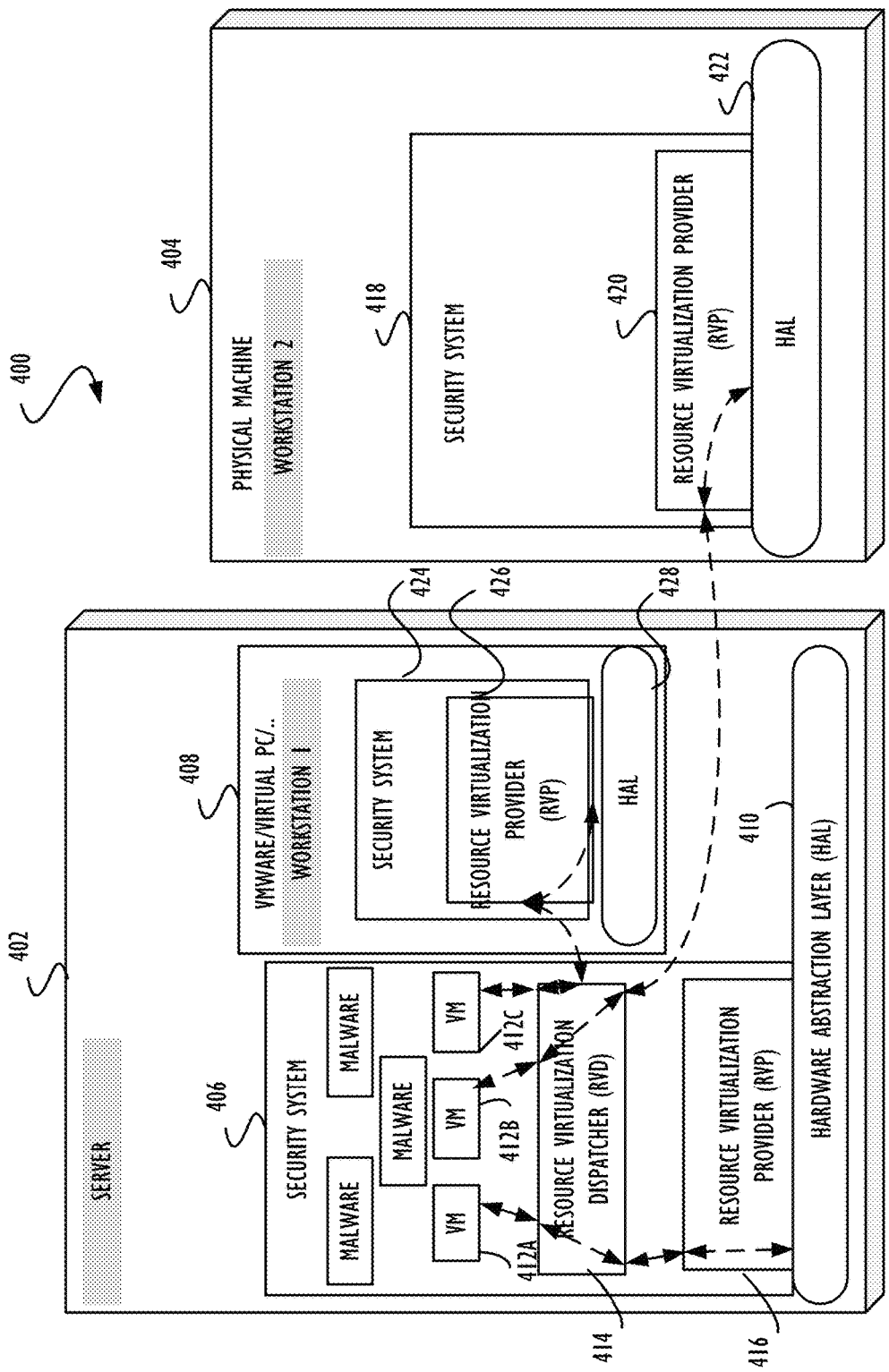
FIG. 4 shows a system for dynamically configuring a virtual environment for identifying unwanted data, in accordance with yet another embodiment.

FIG. 4 shows a system 400 for dynamically configuring a virtual environment for identifying unwanted data, in accordance with yet another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a server 402 is in communication with a separate physical device 404. In one embodiment the separate physical device 404 may include a client device. As an option, the server 402 may be coupled to the separate physical device 404 via a network. Of course, it should be noted that the server 402 may be coupled to any number of separate physical devices.

The server 402 includes a security system 406. The security system 406 may include any type of security system capable of providing a virtual environment for detecting unwanted data (e.g. malware, as shown). In addition, the virtual environment provided by the security system 406 includes a plurality of virtual machines 412A-C. With respect to the present embodiment, each of the virtual machines 412A-C replicates, at least in part, a device. The first virtual machine 412A replicates the server 402, the second virtual machine 412B replicates the separate physical device 404, and the third virtual machine 412C replicates a virtual device 408 located on the server 402.

The virtual device 408 located on the server 402 may include a virtual representation of the separate physical device 404, as an option. Thus, the virtual device 408 may include at least a portion of the properties of the separate physical device 404. As another option, the virtual device 408 may include a virtual representation of an abstract device including properties that are similar across a plurality of separate physical devices coupled to the server 402. Of course, however, the virtual device 408 may include any desired properties. As yet another option, the properties of the virtual device 408 may be periodically updated (e.g. manually by an administrator, automatically utilizing a request, on a schedule, etc.).

In one embodiment, the server 402 may include a gateway to the network via which the server 402 and the separate physical device 404 are coupled. To this end, the server 402 may optionally intercept data communicated to and/or over the network. The data may include electronic messages, files, etc.

In response to receipt of the data, the security system 406 of the server 402 may dynamically configure at least one of the virtual machines 412A-C based on at least one property of an associated device. With respect to the present embodiment, the device may include the server 402, the virtual device 408, or the separate physical device 404. In addition, the property may include any hardware and/or software associated with the device.

As an option, the device may optionally include the device to which the data is destined. For example, if the data is destined for a device with at least some properties replicated by the virtual device 408 located on the server 402, the third virtual machine 412C may be dynamically configured based on at least one property of the virtual device 408. Similarly, if the data is destined for the separate physical device 404, the second virtual machine 412B may be dynamically configured based on at least one property of the separate physical device 404, and if the data is destined for the server 402, the first virtual machine 412B may be dynamically configured based on at least one property of the server 402.

The dynamic configuration may be performed by requesting the property of the device. In one embodiment, a resource virtualization dispatcher (RVD) 414 of the security system 406 may issue the request for the property. The request may be for a particular property, a particular type of property, or any property associated with the device. In one embodiment, the request may be issued to the virtual device 408 located on the server 402 if the data is destined for a device with at least some properties replicated by the virtual device 408, such that resources otherwise consumed by requesting the property from the actual device to which the data is destined may be limited.

To this end, the request may be sent to the device from which the property is requested. Just by way of example, the request may optionally be sent over a network, if the device is coupled to the server 402 via the network. Of course, however, the request may also be sent to the device internally, if the device is located in or includes the server 402.

In response to receipt of the request by a security system 406, 418, 424 of the device from which the property is requested, a resource virtualization provider (RVP) 416, 420, 426 of the security system 406, 418, 424 of such device responds to the request. In one embodiment, the RVP 416, 420, 426 may identify the requested property utilizing a hardware abstraction layer (HAL) 410, 422, 428 of the device. The HAL 410, 422, 428 may optionally be utilized for interfacing the security system 406, 418, 424 and the hardware of the device. Thus, the HAL 410, 422, 428 may be used for identifying hardware associated with the device. For example, the HAL 410, 422, 428 may indicate the property using an abstraction layer used by the RVD 414 of the security system 406 of the server 402.

In another embodiment, the RVP 416, 420, 426 may identify the requested property by identifying software associated with the device. For example, the RVP 416, 420, 426 may utilize a registry of the device for identifying the software. Of course however, the RVP 416, 420, 426 may identify the property in any desired manner. It should be noted that while the RVP 416, 420, 426 is described in the present embodiment as being utilized for identifying the property, any desired module of a device may be utilized for identifying a property of such device. Thus, the security system 406, 418, 424 of each of the devices may not necessarily include the RVP 416, 420, 426.

Furthermore, the RVP 416, 420, 426 may send the requested property to the RVD 414 of the security system 406 of the server 402. The RVD 414 may therefore utilize the property for dynamically configuring the virtual environment. In one embodiment, the RVD 414 may use the property for dynamically configuring the virtual machine 412A-C replicating the device from which the property was received. As an option, the RVD 414 may include or be coupled to a cache for storing the requested property, such that subsequent requests for the property may be avoided.

Moreover, the security system 406 of the server 402 may utilize the virtual environment, or optionally the particular virtual machine 412A-C that has been dynamically configured, for detecting unwanted data. For example, the data received by the server 402 may be executed in the virtual environment. In this way, the virtual environment may be dynamically configured to replicate the device to which the data is destined, such that the dynamically configured virtual environment may be used to determine whether the data destined to be executed on such device includes unwanted data.

FIG. 5 shows a method 500 for conditionally preventing transmission of unwanted data detected utilizing a dynamically configured virtual environment, in accordance with still yet another embodiment. As an option, the method 500 may be carried out in the context of the architecture and environment of FIGS. 1-4. For example, the method 500 may be carried out utilizing the security system 406 of the server 402 of FIG. 4. Of course, however, the method 500 may be carried out in any desired environment. Again, it should be noted that the aforementioned definitions may apply during the present description.

As shown in decision 502, it is determined whether data is received. With respect to the present embodiment, the data may include any data capable of being received by device on which a virtual environment is located. For example, the data may include an electronic message, a file, etc. Further, the data may potentially include unwanted data. Thus, the data may be received for analysis thereof (e.g. for detecting unwanted data, etc.).

As an option, determining whether the data is received may include determining whether data is received over a network. As another option, the determination may be performed by monitoring the receipt of data. For example, a security system of the device on which the virtual environment is located may monitor the receipt of data.

If it is determined that data is not received, the method 500 continues to wait for a determination that data is received. In response to a determination that data is received, a destination of the data may optionally be determined. Note optional operation 504. The destination may include any device to which the data is destined. In the context of the present embodiment, the destination may include a computer system or a network of computers.

In one embodiment, the destination may be determined by analyzing a header of the data. For example, the header may indicate the destination of the data. Of course, however, the destination may be identified in any manner.

Additionally, as shown in operation 506, configuration data of the destination is requested. The configuration data of the destination may include any property of the destination. As an option, the configuration data may be requested by sending a request for such configuration data to the destination.

In another embodiment, the configuration data for any device other than the destination may be requested. For example, if the destination is not determined in option operation 504, the configuration data may be determined for a device other than the destination. Just by way of example, configuration data may be requested for a virtual device located on the device requesting the configuration data. The virtual device may optionally include at least a portion of the configuration data of the destination, as an option.

As another option, the configuration data may be requested by sending a request for such configuration data to a cache located on the device issuing the request. Such cache may store properties previously requested, for example. In one embodiment, the cache may store properties previously requested within a predetermined time period.

Further, as shown in decision 508, it is determined whether the configuration data is received. For example, it may be determined whether the configuration data requested in operation 506 is received. If it is determined that the configuration data is not received, the method 500 continues to wait for the configuration data to be received.

If, however, it is determined that the configuration data is received, the virtual environment is configured based on the configuration data. Note operation 510. In one embodiment, the virtual environment may include a virtual machine. Thus, the virtual machine may be configured utilizing the configuration data.

In another embodiment, the virtual environment may be associated with the device from which the configuration data was received. Just by way of example, the virtual environment may be dedicated for providing a replica of the device from which the configuration data was received. In addition, the virtual environment may optionally be configured by applying the configuration data to the virtual environment. In this way, a configuration of the virtual environment may optionally replicate the configuration of the device to which the data is destined and/or any other device.

Moreover, the data is executed in the configured virtual environment, as shown in operation 512. In one embodiment, the data may be executed by opening the data (e.g. opening an electronic message, opening a file, etc.). In another embodiment, the data may be executed by running the data (e.g. an executable, etc.) in the virtual environment.

Accordingly, the data may optionally be executed in the virtual environment, such that results of the execution may be contained within the virtual environment. Thus, the device on which the virtual environment is located may optionally be protected from the results of the execution of the data. Additionally, the device which is replicated by the virtual environment may also be protected from the results of the execution of the data by executing the data in the virtual environment.

To this end, the configuration data may be requested in response to receipt of the data, before the data is executed in the virtual environment, as described above. As another option however, the configuration data may be requested in response to receipt of the data, while the data is being executed in the virtual environment (not shown). Thus, execution of the data may be initiated prior to requesting the configuration data, or at least a portion of the configuration data.

For example, different portions of the configuration data (e.g. properties of the device replicated by the virtual environment, etc.) may be requested based on a need therefor, while the data is being executed in the virtual environment. In one embodiment, if the data attempts to access an object (e.g. hardware, software, etc.) during execution of the data, configuration data associated with such object may be requested prior to allowing the access to proceed. Just by way of example, if the data references a registry key, configuration data associated with the registry key (e.g. a value of the registry key, etc.) may be requested. In this way, the virtual environment may be configured utilizing configuration data actually used during execution of the data, thus limiting the configuration data requested and used for configuring the virtual environment.

Still yet, it is determined whether unwanted data is detected, as shown in decision 514. With respect to the present embodiment, it may be determined that unwanted data is detected if it is determined that the data executed in the virtual environment includes the unwanted data. The unwanted data may include malware, for example.

In one embodiment, a behavioral analysis may be performed for detecting the unwanted data. For example, results of the execution of the data may be stored and the behavioral analysis may be performed on the results. Of course, however, it may be determined whether unwanted data is detected in any manner.

If it is determined that unwanted data is not detected, the data is transmitted to the destination. Note operation 516. In one embodiment, the data may be transmitted to the destination over a network. For example, the data may be transmitted to the destination over the network if the destination is coupled to the device on which the virtual environment is located via a network. To this end, data determined to be exclusive of unwanted data may be forwarded to an intended destination of such data.

If, however, it is determined that unwanted data is detected, transmission of the data to the destination is prevented. Note operation 518. For example, the transmission of the data may be prevented by blocking the data. As an option, the data may be quarantined, discarded, etc. Accordingly, a reaction to the unwanted data may be performed upon the identification thereof.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

The invention claimed is:

1. A computer readable storage disk or storage device, comprising instructions that, when executed, cause a programmable device to at least:
   execute data in a virtual environment operating on the programmable device;
   request configuration data associated with usage of a second device during execution of the data in the virtual environment, the configuration data including a property associated with an operating system of the second device, the usage indicated in a setting on the second device, the setting identified in contents of a registry file;
   configure the virtual environment on the programmable device while the data is executed in the virtual environment based on the configuration data received in response to the request;
   identify malware in the data utilizing the configured virtual environment; and
   in response to identifying the malware, prevent transmission of the data.

2. The computer readable storage disk or storage device of claim 1, wherein the instructions, when executed, cause the programmable device to configure the virtual environment based on at least one property of the second device, including configuring at least one of a list of hardware, a list of software, a patch identifier, and a binary representation of software.

3. The computer readable storage disk or storage device of claim 1, wherein the virtual environment includes at least one of a virtual machine, an emulator and a sandbox.

4. The computer readable storage disk or storage device of claim 1, wherein the virtual environment includes a virtual replica of the second device.

5. The computer readable storage disk or storage device of claim 1, wherein the instructions, when executed, cause the programmable device to identify the malware utilizing an analysis of data performed in the virtual environment.

6. The computer readable storage disk or storage device of claim 1, wherein the instructions, when executed, cause the programmable device to identify, utilizing a hierarchical data structure, the malware by analyzing data in the virtual environment.

7. The computer readable storage disk or storage device of claim 1, wherein the instructions, when executed, cause the programmable device to perform a responsive action in response to identification of the malware.

8. The computer readable storage disk or storage device of claim 7, wherein the responsive action includes blocking the malware.

9. A method, comprising:
   executing data in a virtual environment operating on a programmable device;
   requesting configuration data associated with usage of a second device during execution of the data in the virtual environment, the configuration data including a property associated with an operating system of the second device, the usage indicated in a setting on the second device, the setting identified in contents of a registry file;
   configuring the virtual environment on the programmable device while the data is executed in the virtual environment based on the configuration data received in response to the request;
   identifying malware in the data utilizing the virtual environment; and
   in response to identifying the malware, preventing transmission of the data.

10. The method of claim 9, wherein the virtual environment is automatically configured.

11. The method of claim 9, wherein configuring the virtual environment includes configuring the virtual environment based on the operating system of the second device and at least one property of the second device, including configuring at least one of a list of hardware, a list of software, a patch identifier, and a binary representation of software.

12. The method of claim 9, wherein the virtual environment includes at least one of a virtual machine, an emulator and a sandbox.

13. The method of claim 9, wherein the virtual environment includes a virtual replica of the second device.

14. The method of claim 9, wherein identifying malware includes utilizing an analysis of data executed in the virtual environment to identify the malware.

15. The method of claim 9, wherein identifying the malware includes analyzing data in the virtual environment based on a hierarchical data structure.

16. The method of claim 9, further including performing a responsive action in response to identifying the malware.

17. The method of claim 16, wherein the responsive action includes blocking the malware.

18. The method of claim 9, wherein the virtual environment is automatically configured.

19. A system, comprising:
   a first device; and
   a second device, the first device including:
      one or more hardware processors; and
      a memory coupled with the one or more hardware processors, on which are stored instructions that, when executed, cause at least some of the one or more hardware processors to:
         execute data in a virtual environment operating on the first device;
         request configuration data associated with usage of the second device during execution of the data in the virtual environment, the configuration data including a property associated with an operating system of the second device, the usage indicated in a setting on the second device, the setting identified in contents of a registry file;
         configure the virtual environment on the first device while the data is executed in the virtual environment based on the configuration data received in response to the request; and
         in response to identifying malware during the execution of the data, prevent transmission of the data.

20. The system of claim 19, wherein the virtual environment is automatically configured.

21. The system of claim 19, wherein the instructions, when executed, cause at least some of the one or more hardware processors to configure the virtual environment further based on at least one property of the second device including at least one of a list of hardware, a list of software, a patch identifier, and a binary representation of software.

22. The system of claim 19, wherein the virtual environment includes at least one of a virtual machine, an emulator, and a sandbox.

23. The system of claim 19, wherein the virtual environment includes a virtual replica of the second device.

24. The system of claim 19, wherein the instructions when executed, cause at least some of the one or more hardware processors to perform a responsive action in response to identifying the malware.

\* \* \* \* \*